Feb. 18, 1930.  H. FRÖHLICH  1,747,358
METHOD AND MECHANISM FOR EFFECTING CORRECT
REGISTRATION IN ELECTRICITY METERS
Filed Dec. 4, 1926
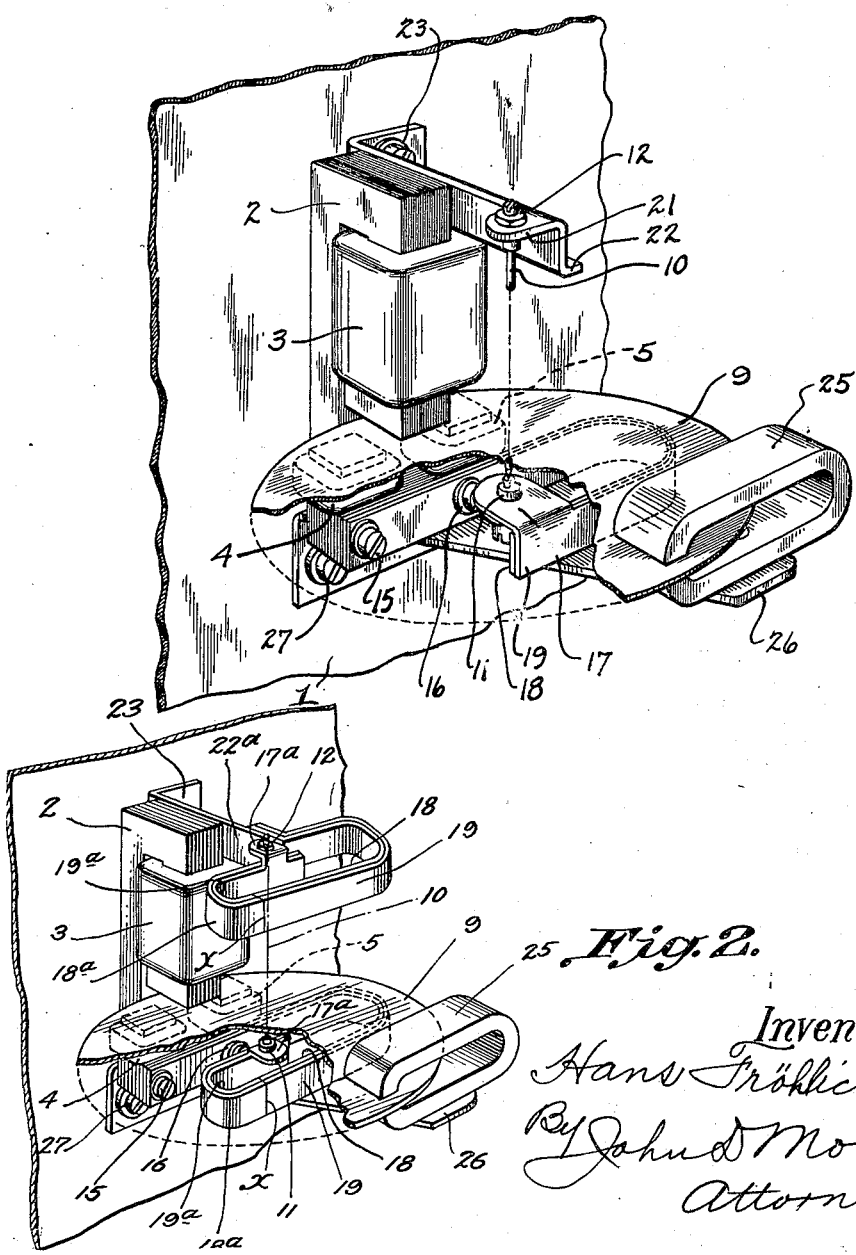
Inventor:
Hans Fröhlich
By John D Morgan
Attorney.

Patented Feb. 18, 1930

1,747,358

UNITED STATES PATENT OFFICE

HANS FRÖHLICH, OF ZUG, SWITZERLAND, ASSIGNOR TO LANDIS & GYR, A.-G., A JOINT-STOCK COMPANY OF SWITZERLAND

METHOD AND MECHANISM FOR EFFECTING CORRECT REGISTRATION IN ELECTRICITY METERS

Application filed December 4, 1926, Serial No. 152,542, and in Switzerland December 24, 1925.

The invention relates to a new and useful method and mechanism for eliminating errors due to temperature changes in electricity meters, and more particularly to such a method and means for effecting the desired result through control of the positional relation of the coils, meter disc and brake.

Objects and advantages of the invention will be set forth in part hereinafter, and in part will be obvious herefrom to those skilled in the art, the same being realized and effected through the method and means pointed out in the appended claims.

The accompanying drawings, herein referred to and constituting a part hereof, illustrate one manner of practicing the method, and one embodiment of a mechanism suitable therefor; and together with the description serve to set forth the principles of the invention.

Of the drawings:—

Fig. 1 is a perspective view of a mechanism embodying the invention; and

Fig. 2 is a view of another form of such a mechanism.

The invention comprises a novel method and means for correcting errors in the registering of electricity meters due to variations in temperature, and according to one feature of the invention this result is attained through varying the positional relation of the driving coils, the meter disc, and the brake magnet, or said relation of two of these elements, such variation and control of the positional relation being effected by the temperature changes.

In practice, preferably, either the meter disc or the brake magnet is provided with a mounting so constituted and constructed that temperature changes will effect a change in the positional relation such that a corresponding corrective change will be effected in the rotation of the meter disc and connected parts so that the registration will remain unaffected by the temperature changes.

It will be understood that the foregoing general description, and the appended detailed description are exemplary and explanatory of the invention, but are not restrictive thereof within the scope of its inherent patentable novelty.

Referring now in detail to the embodiment of the invention illustrated by way of example in the accompanying drawings, a supporting frame 1 is provided (located within the meter casing—not shown), and mounted thereon is a core 2. On one arm of the core 2 is a pressure coil 3 and on other arms of the core are current coils 4 and 5. It will be understood that the number, form and arrangement of these coils may be widely varied as desired.

In this embodiment, the temperature sensitive and movable mounting is applied to the meter disc. Accordingly a meter disc 9 is fixed on a shaft 10. This shaft is journaled at its lower end in a bearing 11, and at its upper end in a bearing 12.

In Fig. 1 of the drawing only the lower bearing of the meter disc is constituted and constructed to be movable in a predetermined manner and degree by the changes in temperature, while in Fig. 2 both bearings of the shaft are so constituted and constructed.

The registering means and the connections therefrom to the meter shaft, as well as certain other parts of the meter, are omitted for the sake of clearness, and as not constituting per se any part of the present invention.

In the form of Fig. 1, a support for the lower bearing for the meter shaft is provided consisting of a bi-metallic strip, approximately in the form of the letter J. The longer member of this mounting is fixed to the lower part of the core by screws 15 and 16, and the opposite and free end of one of the strips is provided with an extension 17 in which the meter shaft bearing is mounted.

This device consists of two metal strips attached together preferably throughout their entire contacting surfaces, one strip 18 having an exceedingly low coefficient of heat expansion, and the other strip 19 having an exceedingly high coefficient of heat expansion. In this embodiment the bearing 12 of the meter shaft is mounted in an extension 21 of an arm 22, projecting outwardly from the supporting member 1 and fixed thereto by a screw 23.

In the present embodiment the brake magnet 25 is preferably mounted on a fixed bearing, that is, it has no predetermined corrective movement effected and controlled by the temperature changes. As embodied, it is mounted on a bracket plate 26, which in turn is supported from the frame 1 by means of screws 27. The brake magnet 25 may be provided with any known or suitable form of adjusting means if desired.

In Fig. 2 of the drawings, both the upper and the lower bearings of the meter disc are shown predeterminably correctively positionable by means controlled by temperature changes.

In this figure also the form of the mounting for the meter shaft bearing is somewhat different. A second turn is formed therein as indicated at $x$, whereby the support is bent inwardly and backwardly upon itself. However, in this additional part the relative position in the support of the strip of metal having the least coefficient of expansion and the strip of metal having the greatest coefficient of expansion are reversed, so that the total movement will be cumulative in the same sense.

In this embodiment the coils, meter disc and brake magnet are positioned in a common diametral relation, and any corrective movement of the disc would have a double corrective action by simultaneously increasing the torque and decreasing the braking action or vice versa.

The total amount of movement of the shaft is exceedingly small, and it will be understood that such movement will be taken care of in the connections to the registering means in any known or other suitable manner.

With variations in temperature, either above or below an approximate normal temperature to which the meter is originally adjusted, the temperature-sensitive mounting of the motor shaft will cause a predetermined movement thereof relatively to the coils and to the brake magnet such that any errors which would otherwise arise through changes or disturbances in the balance of the torque of the coils and the braking action of the magnet will be obviated.

For example should there be a rise in temperature, the bearing or bearings of the meter shaft are moved toward the coils, and thereby the radius at which the brake magnet acts on the motor disc is increased, and the braking action of the magnet is correspondingly increased, and thereby it counteracts any increase in the speed of the motor disc which would result from the rise in temperature. At the same time by reason of this predetermined corrective movement of the meter disc, the locus or loci in the disc of the rotative forces of the electro-magnetic field of the coils is relatively shifted, and thereby the torque exerted on the meter disc is accordingly affected. That is, such locus is moved inwardly along the disc radius and the resultant torque is thereby diminished. That is, means are provided whereby changes in temperature are caused to effect corrective changes in the effective arm of the torque and the braking action to maintain correct registration by the meter.

From all the foregoing it will be understood that a method and a mechanism have been provided for obviating errors due to temperature changes in the meter, such corrective instrumentalities being actuated and governed by temperature changes; and it will be understood further that departures may be made from the illustrative and exemplary embodiment without departing from the principles of the invention and without sacrificing its chief advantages.

What I claim is:—

1. An electricity meter including in combination electro-magnetic driving means, means driven thereby and having connection to recording mechanism, braking means, and temperature controlled means for predeterminedly reversely varying the positional relation of said driving and braking means with respect to said driven means to obviate registration errors from temperature changes.

2. An electricity meter including in combination driving coils, a meter disc and shaft driven directly by the torque produced by said driving coils, a bearing for the meter shaft, a brake magnet, and temperature sensitive means for variably positioning said bearing and thereby changing the driving relation of the coils to the magnet.

3. An electricity meter including in combination driving coils, a meter disc and shaft, a brake magnet, all in common diametral relation, a bearing for the disc shaft and temperature sensitive means for variably positioning the bearing to simultaneously affect the actions of the coils and brake magnet on the disc.

4. The method of obviating errors in the measurement of electric energy by a meter of the type having driving coils and a brake magnet which comprises simultaneously and reversely changing the radial locus of the magnetic flux of the meter coils and of the magnetic field of the brake magnet on a rotating meter element to compensate for changes in temperature.

5. An electricity meter including in combination driving coils, a meter disc, a spindle on which the disc is fixed, a brake magnet spaced from said driving coils, and temperature sensitive mountings on which said disc is fixed for moving said disc and spindle in different directions with respect to said coils and magnet in accordance with the change in temperature.

6. An electricity meter including in combination electromagnetic driving means, a meter disc and spindle driven thereby, a bearing for the meter spindle, braking means spaced from said driving means, and temperature sensitive means for variably positioning said bearing and thereby changing the driving and braking relation of said driving and braking means to the disc.

7. The method of obviating errors in the registration of electric energy by a meter of the type having driving coils, a brake magnet and a driven meter disc which comprises simultaneously oppositely changing the positional relation of the meter disc to the coils and brake magnet.

8. The method of obviating errors in the registration of electric energy by a meter of the type having driving coils, a brake magnet and a driven meter disc which comprises simultaneously oppositely changing the positional relation of the meter disc to the coils and brake magnet, by the action of, and in predetermined relation to, increase or decrease in temperature.

9. The method of obviating errors in the registration of electric energy by a meter of the type having driving coils, a brake magnet and a driven meter disc which comprises simultaneously and reversely varying the torque of the coils and the action of the brake magnet on the meter disc in predetermined relation to increases and decreases in temperature.

In testimony whereof, I have signed my name to this specification.

HANS FRÖHLICH.